United States Patent [19]

Moses

[11] 4,086,726
[45] May 2, 1978

[54] AIRCRAFT DOOR COUNTERBALANCE SYSTEM

[75] Inventor: Brian Keith Moses, Dallas, Tex.

[73] Assignee: The BKM Company, Dallas, Tex.

[21] Appl. No.: 679,173

[22] Filed: Apr. 22, 1976

[51] Int. Cl.² .............................................. E06B 7/28
[52] U.S. Cl. .................................... 49/37; 244/129.5; 49/386
[58] Field of Search .................. 49/37, 386, 197, 200, 49/203, 33, 131; 244/129.5, 129.6; 16/198

[56] References Cited

U.S. PATENT DOCUMENTS

| | | | |
|---|---|---|---|
| 2,663,047 | 12/1953 | Grenzeback | 49/197 X |
| 2,931,599 | 4/1960 | McQuilkin | 49/37 X |
| 3,091,818 | 6/1963 | Clark | 49/386 X |

FOREIGN PATENT DOCUMENTS

| | | | |
|---|---|---|---|
| 1,256,840 | 2/1961 | France | 149/197 |
| 273,644 | 1/1962 | Netherlands | 49/197 |

*Primary Examiner*—Kenneth Downey
*Attorney, Agent, or Firm*—Arnold, White & Durkee

[57] ABSTRACT

A counterbalance system for aircraft doors which includes a varying radius pulley mounted to the door and a spring-powered reel to apply a substantially uniform force on the pulley to exert a moment on the pulley which is opposite the moment exerted by the door.

12 Claims, 2 Drawing Figures

AIRCRAFT DOOR COUNTERBALANCE SYSTEM

BACKGROUND OF THE INVENTION

1. Field of the Invention

The invention relates to an aircraft door counter-balance system for aircraft doors which rotate about a horizontal axis.

2. Description of the Prior Art

Many aircraft presently in use have passenger doors which are mounted within the fuselage of the aircraft and rotate about a horizontal axis as the door is opened and closed. Particularly in the case of jet aircraft, wherein the passenger compartment of the aircraft is pressurized, the aircraft door is quite bulky and heavy. Typically, an aircraft door for such a jet aircraft may weigh approximately 200 pounds or more. Because of the bulky nature and weight of these aircraft doors, many problems are associated with the opening and closing of such doors by a person located either inside or outside the aircraft. For example, in the case of aircraft doors which rotate about a horizontal axis generally located at the lower portion of the door, there is a tendency for the door to develop momentum and swing rapidly downward as the door is opened, such that a person cannot control the movement of the door. Thus, in many instances, instead of being slowly opened, the door quickly swings downwardly until a portion of the door abuts a section of the fuselage. The section of the fuselage upon which the door abuts may be damaged by the force exerted by the weight of the door. In the case of pressurized jet aircraft, the cost associated with repairing a section of the fuselage can be extremely expensive.

When the door is opened from within the aircraft, there is a strong likelihood, in addition to possible damage to the aircraft, that the person opening the door may be seriously injured. As the door swings outwardly and downwardly into an opened position, the only portion of the door which a person may grasp is disposed along the lower portion of the door. Accordingly, the person does not have much leverage to counteract the forces exerted by the door if the door acquires momentum and swings down too rapidly. If that occurs the door has a tendency to pull the person opening the door outwardly from the aircraft. Consequently, the person is faced with the decision whether to release his grasp on the door, whereby the door may damage the aircraft fuselage, or to attempt to continue to grasp the door and risk being pulled headfirst from the aircraft onto the runway, which is located a substantial distance below the opening in the aircraft fuselage wherein the door is located.

If the door is opened by a person standing on the runway outside the aircraft, there is also a high likelihood that, in addition to possible damage to the aircraft, the person standing on the runway could be seriouly injured if the door were to rapidly swing open and strike him. If the person is merely standing in a position located underneath the door as one of the aircraft crew members attempts to open the door from within, he may likewise be injured by the door if it swings down rapidly.

Another problem associated with such aircraft doors occurs when trying to close the door. When the door is in an open position it overhangs the edge of the aircraft fuselage by a considerable amount and the center of gravity of the door is therefore located a considerable distance from the edge of the aircraft fuselage. Since the door must be grasped about the lower portion of the door in order to close it, a person located within the aircraft must bend down and extend his arms outwardly a considerable distance to grasp the lower portion of the door and then lift the weight of the door. However, this position is not conducive for exerting an effective lifting motion and, consequently, the weight of the door exerts a great strain upon a person's back. In the case wherein a person outside the aircraft on the runway attempts to close the door, the potential again exists for damaging the aircraft. Aside from the necessity of lifting the heavy door, the door, as it approaches a closed position has a tendency to slam into the fuselage, thereby possibly damaging the door and/or the fuselage.

One suggested solution for these problems has been to incorporate some type of counterbalance system disposed within the aircraft fuselage. For example, in the case of the North American Sabreliner jet aircraft, a counterbalance system is provided which provides a constant door counterbalancing force of approximately eighty pounds. However, the door of a Sabreliner weighs in excess of two hundred pounds, whereby a counterbalancing force in excess of one hundred twenty pounds must still be supplied in order to open and close the door. Additionally, the torque required to counterbalance the door is not a constant value, due to the manner in which the door rotates into its opened or closed position. Since the length of the moment arm, the distance between the door's horizontal axis of rotation and the door's center of gravity, is constantly changing, the torque necessary to counterbalance the weight of the door is likewise constantly changing.

Therefore, in addition to the disadvantage of not providing enough counterbalancing force, presently known counterbalancing systems do not provide a counterbalancing force which is varied dependent upon the position of the door as it is opened and closed. In the case of the North American Sabreliner, the constant eighty pound counterbalancing force does not adequately counterbalance the door whereby it may easily be opened and closed. As the door assumes a closed position the present counterbalance system tends to apply torque in excess of that required to counterbalance the door, whereby one must push against the door to prevent it from slamming into the aircraft fuselage. As the door assumes an opened position, the door tends to swing down rapidly and abut the fuselage, as previously described, since the present counterbalance system does not provide enough counterbalancing force.

Another disadvantage of known counterbalance systems for aircraft doors resides in their excessive weight. The more an aircraft weighs, the less payload the aircraft may accommodate. Therefore, many aircraft have either no door counterbalancing system or an inadequate counterbalancing system due to the aircraft designer's desire to minimize the weight of the aircraft.

Accordingly, prior to the development of the present invention, there has been no aircraft door counterbalance system available which is light in weight, exerts a variable torque upon the door, prevents damage to the aircraft door, and/or aircraft fuselage, prevents physical injury to those persons opening or closing the aircraft door, and enables fingertip operation when closing and opening the aircraft door. Therefore, the art has sought an efficient, light weight, safe, and inexpensive aircraft door counterbalance system for counterbalancing the weight of an aircraft door as it is opened and closed.

SUMMARY OF THE INVENTION

In accordance with the invention the foregoing has been achieved through the present aircraft door counterbalance system. The system of the present invention comprises a varying radius pulley mounted to an aircraft door and a means for applying a substantially uniform force on the periphery of the pulley to exert a moment on the pulley, which is opposite the moment exerted by the door, whereby forces imposed by the door are counterbalanced as the door is moved between an opened and closed position.

The present invention also includes an improvement in an aircraft having a door rotatably mounted in the aircraft fuselage, which door is adapted to swing outwardly from said fuselage about an axis to an opened position and which door presents a changing moment arm during movement between an opened and closed position, wherein a counterbalance system is provided which includes:
- a varying radius pulley mounted on the door, and which rotates about an axis upon movement of the door between an opened and closed position; and
- means to apply a substantially uniform force on the periphery of said pulley to exert a moment on the pulley opposite the moment exerted by the door, to counterbalance forces imposed by the door as it is moved between an opened and closed position.

As indicated above, in more specific terms, the system of the present invention includes a spring-powered reel serving as the means to apply the substantially uniform force. Additionally, a shaft is rotatably mounted within the spring-powered reel; a second pulley is mounted upon that shaft; and a cable is wrapped about the second pulley and is attached to the varying radius pulley.

A feature of the present invention resides in the fact that the varying radius pulley is attached to a control arm of the aircraft door, whereby the varying radius pulley rotates with the door as the door is opened and closed.

The system of the present invention when compared with previously proposed prior art counterbalancing systems has the advantages of efficiency, safety, low weight, exertion of a varying moment, or torque, which corresponds to the varying torque required to open and close the door, and economy.

While the invention will be described in connection with the preferred embodiment, it will understood that it is not intended to limit the invention to that embodiment. On the contrary, it is intended to cover all alternatives, modifications, and equivalents as may be included within the spirit and scope of the invention as defined by the appended claims.

DETAILED DESCRIPTION OF THE INVENTION

Figure 1:
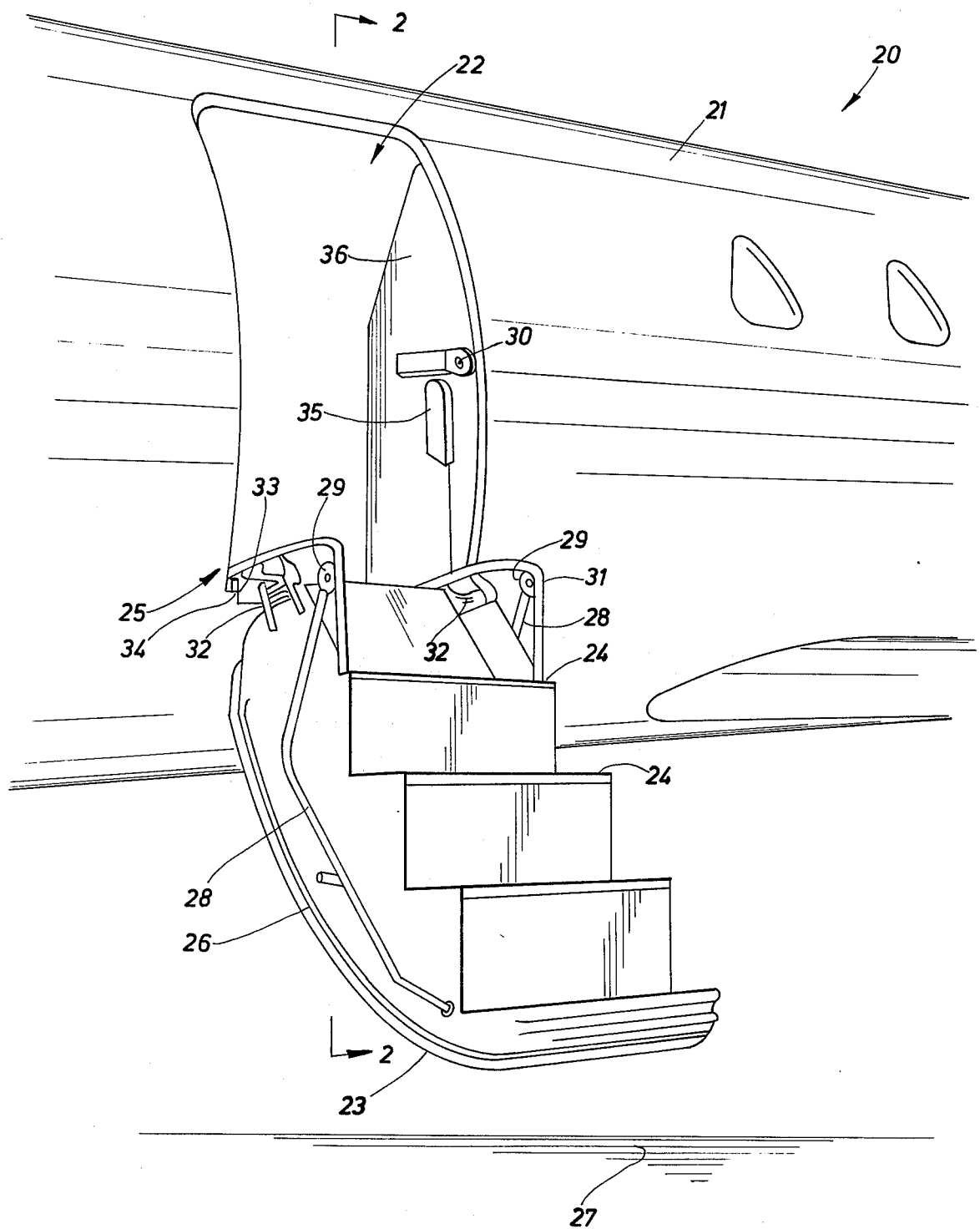
FIG. 1 is a perspective view of a typical aircraft door, which includes integral steps.

Turning first to FIG. 1, a conventional aircraft 20 is shown which includes fuselage 21. Fuselage 21 has an opening 22 therein with a door 23 mounted in opening 22. Aircraft 20, including its fuselage 21 and door 23, is of standard construction, although for purposes of illustration aircraft 20 has a fuselage 21 which enables the interior of the aircraft 20 to be pressurized. Door 23 rotates about a substantially horizontal axis generally located at the lower portion 25 of opening 22 and swings outwardly into its opened position, as shown in FIG. 1. Door 23 has an outer curved portion 26 which corresponds to the curvature of the aircraft fuselage 21.

As can be readily seen in FIG. 1, the lower portion 25 of opening 22 is disposed a sufficient distance above runway 27 to necessitate the use of a door 23 having steps 24 formed integrally therein to enable a person to readily enter and exit from aircraft 20. Door 23 is further provided with handrails 28 disposed on both sides of the door 23. These handrails 28 pivot about mountings 29 into engagement with mounting brackets 30 positioned within aircraft 20, whereby after the door 23 is opened the handrails 28 are swung into engagement with mounting brackets 30.

Door 23 further includes two control arms 31 fixedly attached to both sides of door 23 by brackets 32. Brackets 32 also serve as the handles which a person, located within aircraft 20, would grasp as he opens or closes door 23. Mounted to control arms 31 are two adjustable stops 33 (only one of which is shown in FIG. 1), which abut a portion 34 of fuselage 21 as the door is rotated and swung outwardly into its fully opened position as shown in FIG. 1.

Still referring to FIG. 1, there is shown a cover member 35 which is mounted to an interior wall 36 of aircraft 20. Cover member 35 overlies a portion of the present invention to be hereinafter described.

Figure 2:
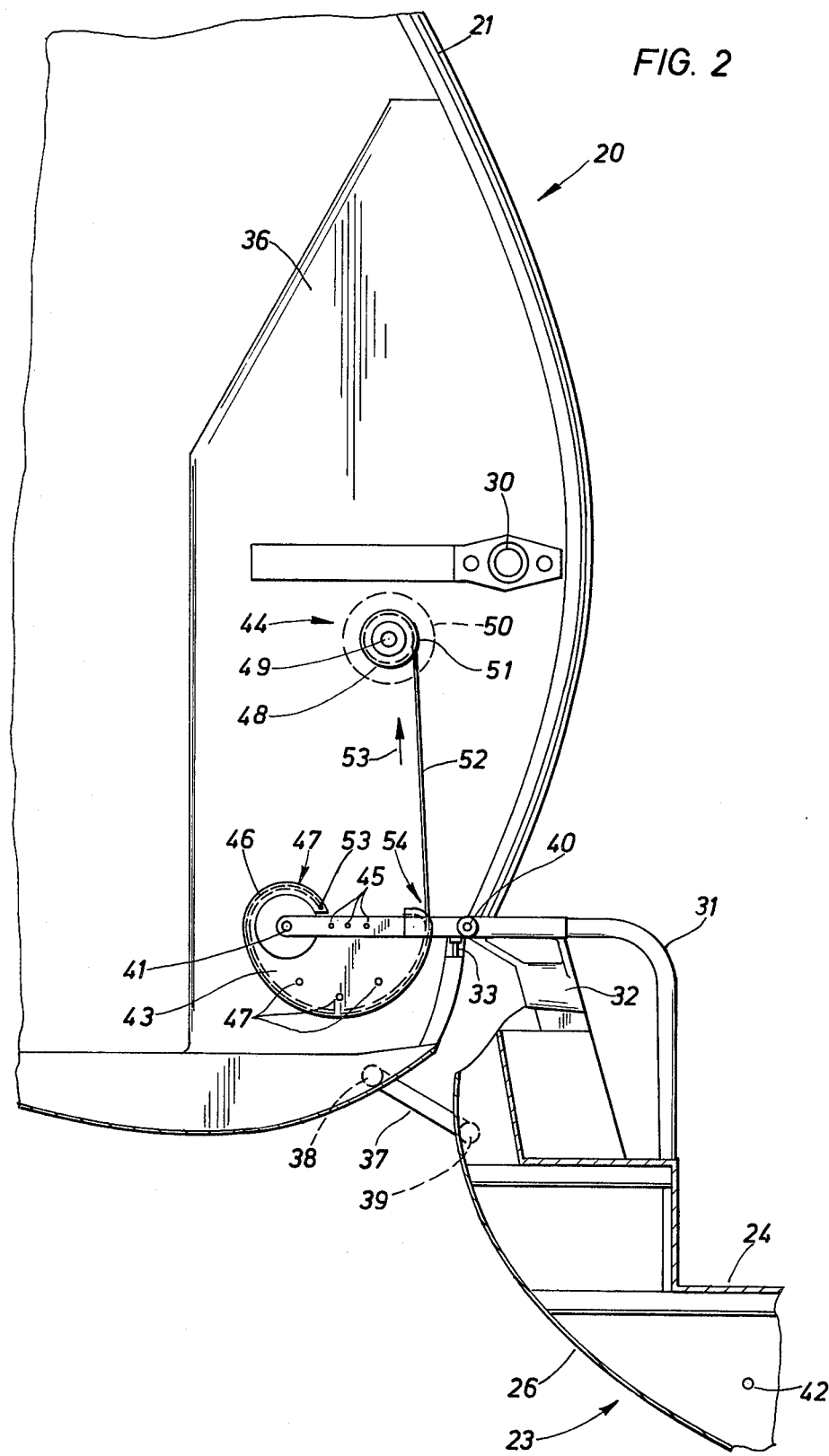
FIG. 2 is a cross sectional view of the aircraft taken along line 2—2 of FIG. 1, wherein the aircraft is provided with the present invention.

Turning now to FIG. 2, there is shown the counterbalance system of the present invention. For ease of illustration, cover member 35 is not shown. Cover member 35 serves merely to prevent persons, when entering the aircraft, from bumping into a portion of the counterbalance system and injuring themselves or soiling their clothes. Additionally, cover member 35 serves to prevent damage to the clothing of persons located within the aircraft as they open or close the aircraft door while inside the aircraft. It should be readily understood that cover member 35 is not necessary for the overall operation of the counterbalance system to be hereinafter described.

Still referring to FIG. 2, door 23 is shown in its opened position. For ease of illustration, handrail 28 is not shown. Door 23 further includes connection member 37, which in conjunction with control arms 31, connects door 23 to the aircraft 20. Connection member 37 has a pivotal connection 38 within fuselage 21 and another pivotal connection 39 disposed within aircraft door 23. Connection member 37 and pivotal connections 38 and 39 are of standard construction. Door control arm 31 include pivotal connection 40 disposed adjacent bracket 32. At one end of door control arm 31 is disposed a shaft 41 which is attached to door control arm 31. Shaft 41 is mounted for rotation within a suitable bearing (not shown) within wall 36. Another shaft 41 (not shown) is mounted on the other side of door 23 to the other control arm 31.

As door 23 is moved from the opened position shown in FIG. 2 to a fully closed position, door 23 will rotate about a substantially horizontal axis extending through shafts 41. As door 23 rotates about shafts 41, door 23 will also be pivoting about pivotal connections 38, 39, and 40, whereby door 23 will be able to properly move into its fully closed position within opening 22 in fuselage 21.

In view of the fact that door 23 is simultaneously rotating about shafts 41 and pivotal connections 38, 39, and 40, the location of the center of gravity 42 (the location shown in FIG. 2 is merely for purposes of illustration) of door 23 will be constantly changing with respect to the substantially horizontal axis of rotation at shafts 41. Accordingly, since the distance between the axis of shafts 41 and the center of gravity 41 of door 23 is constantly changing, the length of the moment arm between these points will be changing during movement of the door 23 between its opened and closed positions. Since the weight of door 23 is a constant value, the moment, or torque, necessary to counterbalance the door, which is the product of the weight of door 23 times the length of its moment arm, is likewise constantly changing.

In accordance with the present invention, a counterbalance system is provided which exerts a variable moment, or torque, upon door 23, whereby the weight of door 23 is effectively counterbalanced. This system enables door 23 to be easily opened and closed, while preventing damage to the aircraft door and/or aircraft fuselage. Furthermore, the counterbalance system of the present invention prevents the occurrence of physical injury to those persons opening or closing door 23.

In a preferred embodiment, the counterbalance system of the present invention includes a varying radius pulley 43 and a means 44 to apply a substantially uniform force on the periphery of pulley 43. As can be seen in FIG. 2, pulley 43 is mounted to the aircraft door 23 upon door control arm 31. Pulley 43 may be attached to door control arm 31 by any suitable attachment means such as bolts or screws 45. Disposed along the periphery of pulley 43 is a groove 46 (shown in dotted lines).

From an examination of FIG. 2, it is readily apparent that the radii from the center of pulley 43, disposed at shaft 41, to the groove 46 are of different lengths. Thus pulley 43 is described as being a varying radius pulley. Pulley 43 is manufactured from a material which has sufficient strength and wear characteristics and is light in weight. In a preferred embodiment, pulley 43 is manufactured from aluminum; however, other materials such as various steels or plastics also could be utilized. Additionally, pulley 43 may be provided with cut-outs 47 which serve to further provide savings in weight for the counterbalance system, while not affecting the strength and wear characteristics of pulley 43.

Referring now to the means 44 for placing a substantially uniform force on the periphery of pulley 43, a pulley 48 is securely mounted upon a shaft 49, which extends inwardly to the interior portion of wall 36. Pulley 48 is disposed on the exterior of wall 36. Shaft 49 is rotatably mounted within a spring-powered reel 50, which is suitably attached to the interior of wall 36 by suitable attachment means, such as bolts or screws (not shown). Reel 50 may be provided with a flange (not shown) to facillitate its attachment to wall 36. Spring-powered reel 50 is of conventional construction, but is provided with a lubricant which has low temperature operating characteristics, in accordance with its use as an aircraft component operating at high altitudes.

Conventional spring-powered reels are provided with a cable which is wrapped around the periphery of the reel. The reel rotates about a fixed shaft and as the cable is pulled to an extended position from the reel, the spring within the reel exerts a substantially uniform force upon the cable in a direction opposite to that in which the cable is being pulled. Thus, when using conventional spring-powered reels, the reel rotates about a fixed shaft. However, in the preferred embodiment of the present invention, the conventional spring-powered reel 50 is affixed to the interior portion of wall 36 and shaft 49 is allowed to rotate within reel 50, whereby reel 50 exerts a substantially uniform rotational force upon shaft 49. In turn, this substantially uniform rotational force applied to shaft 49 acts upon pulley 48. Ametek/Hunter Spring, Inc., is one manufacturer of spring-powered reels suitable for use in the present invention.

Wrapped about the periphery 51 of pulley 48 is a cable 52. Cable 52 is placed about variable radius pulley 43 and is attached to varying radius pulley 43 by a suitable cable retainer or clip 53. Accordingly, spring powered reel 50, shaft 49, and pulley 48 serve to exert a substantially uniform force upon cable 52 in the direction shown by arrow 53. This substantially uniform force is in turn applied to the periphery of varying radius 43 via cable 52.

Cable 52 may be any suitable material which has the necessary strength and flexibility characteristics, such as steel or nylon. However, the use of a flexible, small diameter stainless steel cable is preferred for use as cable 52. A 1/16 inch diameter stainless steel cable has proven to be an adequate size and type of material for cable 52, although it should be readily apparent that other sizes and types of cables could be utilized dependent upon the weight of the door 23 to be counterbalanced.

By way of illustration only, varying radius pulley 43 may be of a relatively thin construction; e.g., in the case of the North American Sabreliner jet aircraft, varying radius pulley 43 can be approximately ¼ inch in thickness with a groove 46 capable of accommodating a 1/16 inch diameter cable.

When door 23 has been swung outwardly to its fully opened position as shown in FIG. 2, the torque required to counterbalance the weight of door 23 is at its highest value. In the fully opened position the moment exerted by door 23 is at its greatest value because the length of the moment arm of door 23, or the distance from shaft 41 to the center of gravity 42 of door 23, is at its greatest value. When door 23 has been swung outwardly to its fully opened position, the moment arm of pulley 43 is the distance between shaft 41 and the point on the periphery of pulley 43, generally shown at 54, which is the location of the force being exerted by spring-powered reel 50, via cable 52, upon pulley 43. This moment arm is longer than any other moment arm of pulley 43, whereby door 23 will be effectively counterbalanced when it is in its fully opened position. Thus, when door 23 has been swung outwardly to its fully opened position, the moment exerted by door 23 is counterbalanced by the moment exerted on pulley 43 by the application of a substantially uniform force on the periphery of pulley 43 by spring-powered reel 50, shaft 49, pulley 48, and cable 52.

Likewise, when door 23 swings inwardly toward its closed position, door 23 exerts a substantially smaller moment since the center of gravity 42 of door 23 is now located closer to its substantially horizontal axis of rotation about shaft 41. Therefore, when door 23 approaches its closed position, the moment arm of pulley 43 is the distance between shaft 41 and the point on the periphery of pulley 43, generally shown at 41, whereat the force is being applied upon the pulley 43 by reel 50. Since the length of this moment arm is shorter, a smaller moment is exerted upon pulley 43 to counterbalance the smaller moment exerted by door 23.

Thus, as door 23 moves between its opened and closed positions and presents a changing moment arm, the counterbalance system of the present invention provides a varying moment, or torque, to effectively counterbalance the forces imposed by door 23.

In the previously described embodiment only one counterbalance system, comprised of variable radius pulley 43, cable 52, pulley 48, shaft 49 and spring-powered reel 50, has been described. It should be readily understood that a varying radius pulley 43 and the related components of the counterbalance system could be mounted on both sides of door 23; e.g., another varying radius pulley 43 could be attached to the other door control arm 31 with the other components of the counterbalance system being disposed on the wall (not shown) on the opposite side of opening 22. If two counterbalance systems are utilized, it should be readily apparent that the force exerted by each of the two spring-powered reels 50 need only be ½ that amount of force exerted were only one spring-powered reel 50 to be utilized.

It should also be pointed out that, whereas the preferred embodiment utilizes a spring-powered reel 50, which is in a fixed position with respect to the rotatable shaft 49 which receives the substantially uniform rotational force from spring-powered reel 50, it would be an obvious modification to have shaft 49 in a fixed position with respect to spring-powered reel 50, whereby the substantially uniform force being applied to the periphery of pulley 43 would be derived directly from spring-powered reel 50. In that embodiment, shaft 49 would be secured to the exterior of wall 36, with spring-powered reel 50 attached for rotation about shaft 49. Cable 52 would then be mounted directly upon spring-powered reel 50, whereby spring-powered reel 50 would exert a substantially uniform force, via cable 52 on the periphery of pulley 43.

It should also be readily apparent that the shape of varying radius pully 43 would vary dependent upon the particular aircraft door 23 which is being counterbalance.

Another modification which could readily be made to the present invention would be to mount reel 50, and its associated components, not on wall 36, but rather upon any other suitable structural member within aircraft 20; e.g., a structural brace or the ceiling of aircraft 20, provided, suitable means are utilized to guide cable 52 into alignment with pulley 43.

The foregoing description of the invention has been directed in primary part to a particular preferred embodiment in accordance with the requirements of the Patent Statutes and for purposes of explanation and illustration. It will be apparent, however, to those skilled in this art that many modifications and changes in this specific apparatus utilized may be made without departing from the scope and spirit of the invention. For example, the counterbalance system of the present invention could be readily utilized with aircraft doors which swing outwardly and upwardly to an opened position.

It is applicant's intention in the following claims to cover such modifications and variations as fall within the true spirit and scope of the invention.

What is claimed is:

1. A counterbalance system for use with an aircraft door which is rotably mounted about a substantially horizontal axis generally located at the lower portion of the door and opens by swingly outwardly from the aircraft fuselage, said door including connection means for connecting the door to the fuselage, and which door presents a changing moment arm during movement between an opened and closed position, comprising:

a varying radius pulley to be mounted on said connection means and which rotates about a substantially horizontal axis upon movement of the door between an opened and closed position; and means to apply a substantially uniform force on the periphery of said pulley to exert a moment on said pulley opposite the moment exerted by said door, to counterbalance forces imposed by the door as it is moved between an opened and closed position.

2. The counterbalance system of claim 1 wherein the means to apply a substantially uniform force on the varying radius pulley includes a spring-powered reel.

3. The counterbalance system of claim 2, which further includes:

a shaft rotatably mounted within said spring-powered reel;

a second pulley mounted upon said shaft; and a cable wrapped about said second pulley and attached to said varying radius pulley.

4. The counterbalance system of claim 2 wherein said spring-powered reel includes means for attaching said reel to an interior wall of an aircraft.

5. The counterbalance system of claim 1 wherein the varying radius pulley includes means for attaching said pulley to a door control arm of said door.

6. The counterbalance system of claim 2 wherein said reel is provided with a lubricant having low temperature operating characteristics.

7. In an aircraft having a door rotatably mounted in the aircraft fuselage about a substantially horizontal axis generally located at the lower portion of the door, said door including connection means for connecting the door to the fuselage, which door is adapted to swing outwardly from said fuselage about said axis to an opened position and presents a changing moment arm during movement between an opened and closed position, the improvement which comprises:

a counterbalance system which includes:

a varying radius pulley mounted on said connections means and which rotates about a substantially horizontal axis upon movement of the door between an opened and closed position; and a means to apply a substantially uniform force on the periphery of said pulley to exert a moment on said pulley opposite the moment exerted by said door, to counterbalance forces imposed by the door as it is moved between an opened and closed position.

8. The improvement of claim 7, wherein the means to apply a substantially uniform force on the varying radius pulley includes a spring-powered reel.

9. The improvement of claim 8 which further includes:

a shaft rotatably mounted within said spring-powered reel;

a second pulley mounted upon said shaft; and a cable wrapped about said second pulley and attached to said varying radius pulley.

10. The improvement of claim 8 wherein said spring-powered reel is attached to an interior wall of said aircraft.

11. The improvement of claim 7 wherein said varying radius pulley is attached to a door control arm of said door.

12. The improvement of claim 7 wherein said door and said varying radius pulley are mounted for rotation about a substantially horizontal axis.

* * * * *

UNITED STATES PATENT OFFICE
CERTIFICATE OF CORRECTION

Patent No. 4,086,726            Dated May 2, 1978

Inventor(s) BRIAN KEITH MOSES

It is certified that error appears in the above-identified patent and that said Letters Patent are hereby corrected as shown below:

Column 3, line 63, "will understood" should read --will be understood--.

Column 8, line 8, "rotably" should read --rotatably--.

Column 8, line 10, "swingly" should read --swinging--.

Column 8, line 55, "tions" should read --tion--.

Signed and Sealed this

Twenty-first Day of November 1978

[SEAL]

Attest:

RUTH C. MASON
*Attesting Officer*

DONALD W. BANNER
*Commissioner of Patents and Trademarks*